United States Patent [19]
Graeff

[11] Patent Number: 5,659,974
[45] Date of Patent: Aug. 26, 1997

[54] METHOD FOR REGENERATION OF AN ADSORBENT MATERIAL CONTAINING MOISTURE AND APPARATUS THEREFOR

[76] Inventor: Roderich Wilhelm Graeff, Kollwitzweg 19, Darmstadt, Germany, 64291

[21] Appl. No.: 643,555

[22] Filed: May 6, 1996

[30] Foreign Application Priority Data

May 4, 1995 [DE] Germany ................ 195 16 311.7

[51] Int. Cl.⁶ ................................................ F26B 7/00
[52] U.S. Cl. ........................ 34/378; 34/391; 34/474; 34/507; 95/113; 95/125
[58] Field of Search .................. 34/377, 378, 391, 34/467, 474, 507, 72, 73, 75, 76, 80; 95/113, 125; 62/272, 271, 93, 94; 165/8, 9

[56] References Cited

U.S. PATENT DOCUMENTS

| | | | |
|---|---|---|---|
| 3,176,446 | 4/1965 | Siggelin | 55/189 |
| 3,708,956 | 1/1973 | Norbäck | 95/113 X |
| 3,712,027 | 1/1973 | Hasz | 55/33 |
| 3,757,491 | 9/1973 | Gourdine | 55/107 |
| 3,855,719 | 12/1974 | Jonsson | 34/75 X |
| 4,134,743 | 1/1979 | Macriss et al. | 95/113 |
| 4,256,606 | 3/1981 | Noack et al. | 252/411 R |
| 4,509,272 | 4/1985 | Gräff | 34/473 |
| 4,858,335 | 8/1989 | Roth | 34/80 X |
| 4,870,760 | 10/1989 | Gräff | 34/473 |
| 4,926,618 | 5/1990 | Ratliff | 95/10 |
| 5,167,679 | 12/1992 | Maekawa et al. | 96/125 |
| 5,183,098 | 2/1993 | Chagnot | 165/8 |
| 5,542,259 | 8/1996 | Worek et al. | 34/80 X |

FOREIGN PATENT DOCUMENTS

| | | |
|---|---|---|
| 0 051 501 | 11/1981 | European Pat. Off. |
| 1176335 | 4/1958 | Germany |
| 2301045 | 1/1973 | Germany |
| A2717442 | 10/1978 | Germany |
| 43 17 768 | 12/1994 | Germany |
| 747505 | 7/1980 | U.S.S.R. |

OTHER PUBLICATIONS

Database WPI, Week 9306, Derwent Publications Ltd., London, GB AN 93–047992, XP002017676, & JP-A-04 371 209 (Hitachi), Dec. 1992.

Patent Abstracts of Japan, vol. 16, No. 61 (C–0910) & JP-A-03 258324 (Kogai Kenko Higai Hoshiyou), 18 Nov. 1991.

Patent Abstracts of Japan, vol. 17, No. 670 (C–1139) & JP-A-05 220336 (Hitachi Zosen), 31 Aug. 1993.

*Primary Examiner*—John M. Sollecito
*Assistant Examiner*—Steve Gravini
*Attorney, Agent, or Firm*—Jacobson, Price, Holman & Stern, PLLC

[57] ABSTRACT

A method and apparatus for preparing and regenerating an adsorbent material which material contains a medium (particularly moisture). The medium is removed from the adsorbent material by a hot regeneration gas, following which the adsorbent material is cooled. In order to improve the energy efficiency ("energy balance") in a process for drying a humid gas, particularly humid air, it is proposed that regeneration offgas be passed through the adsorbent material immediately before the adsorbent material is subjected to (final) regeneration, the regeneration offgas having a lower temperature than the hot regeneration gas.

13 Claims, 4 Drawing Sheets

METHOD FOR REGENERATION OF AN ADSORBENT MATERIAL CONTAINING MOISTURE AND APPARATUS THEREFOR

FIELD OF THE INVENTION

The invention relates to a method for preparing an adsorbent material for generally reversibly adsorbing a medium, which medium may be particularly moisture, wherewith hot regeneration gas is used to remove the medium from the adsorbent material, following which the adsorbent material is cooled; and the invention further relates to an apparatus for carrying out the inventive method.

BACKGROUND OF THE INVENTION

A method of drying granular plastics is described in U.S. Pat. No. 4,509,272, according to which hot dry air flowing through a bed of the granulate removes the moisture from the granulate. The moist air leaving the granulate drying operation is then passed through an adsorbent material, which is usually a molecular sieve material or a mixture of a molecular sieve material with silica gel, whereby the moisture which entered the air stream from the granulate bed is removed from the air stream by adsorption. When the adsorbent material becomes saturated with moisture, it is subjected to regeneration, wherein hot regeneration gas is passed through the adsorbent material, causing the water contained in the adsorbent material to vaporize and be transported away in the regeneration offgas (regeneration exhaust air). After completion of the regeneration, the thereby dried adsorbent material is reused for adsorbing moisture by passing moist air from the granulate vessel through the adsorbent material.

This means of drying moist exhaust air from granulate drying is very effective, but is relatively energy intensive. A large amount of energy is lost from venting the hot regeneration offgas at the end of the regeneration cycle. Attempts have been made to pass the regeneration offgas from the adsorbent material through a heat exchanger, to warm the regeneration gas drawn in by suction from the exterior, prior to feeding the gas through the adsorbent material. A problem presented is that, particularly at the beginning of the regeneration cycle, the hot regeneration offgas from the adsorbent material undergoing regeneration carries substantial water vapor, which is deposited in the heat exchanger. This leads to premature corrosion of the heat exchanger. Further, the heat exchanger adds to the capital and maintenance costs of the apparatus.

SUMMARY OF THE INVENTION

Accordingly, the object of the present invention is to improve the energy efficiency of the drying of a moisture-containing gas, particularly moist air.

In a method according to that described initially supra, the object of the invention is achieved in that regeneration offgas is passed through the adsorbent material immediately prior to the operation of regeneration of the adsorbent material, the regeneration offgas having a lower temperature than the hot regeneration gas. Thus the heat content of the regeneration offgas leaving the adsorbent material undergoing regeneration is utilized for heating other adsorbent material in the state of the other adsorbent material immediately prior to the start of the regeneration of the other adsorbent material. In this way, the heat content of the regeneration offgas is appreciably recovered in the process; furthermore, the heat exchanger used for preheating the cold regeneration gas is dispensed with. Of course, the regeneration offgas from the adsorbent material undergoing regeneration does contain water (which it picked up during the regeneration process), and this water might be subject to being deposited on or in the adsorbent material undergoing pre-regeneration with the regeneration offgas; however, because the adsorbent material is saturated with moisture in its state immediately before the start of the regeneration operation i.e. before the described pretreatment with regeneration offgas, only a small proportion, if any, of the water carried by the regeneration offgas is deposited on or in this adsorbent material. By the time the regeneration of the adsorbent material has concluded, the water content of the very hot regeneration offgas leaving the adsorbent material undergoing regeneration has become extremely low. Consequently, all of the heat energy of the regeneration offgas leaving the adsorbent material can be utilized in the preheating and pre-regenerating of adsorbent material in the state of the adsorbent material immediately before its entry into the regeneration operations. Thus, the adsorbent material is processed in a pre-regeneration zone and subsequently in a (final) regeneration zone, wherewith final and complete regeneration takes place in the latter zone. The regeneration offgas introduced to the pre-regeneration zone always has a lower temperature than the regeneration gas introduced to the (final) regeneration zone.

The invention is particularly effective when used with a process, particularly a cyclic process, wherein an adsorbent material is moved through the following operations:

an adsorption phase, in which the adsorbent material removes moisture from a gas;

a pre-regeneration phase, in which the adsorbent material is heated and "pre-regenerated" by regeneration offgas such that the temperature of said adsorbent material is increased toward the regeneration temperature; and a (final) regeneration phase in which the adsorbent material containing a saturation level of moisture is completely regenerated.

A particularly suitable apparatus for carrying out the inventive method is an apparatus for drying a humid gas (particularly air), comprised of a blower which feeds the humid gas to a container containing an adsorbent material, wherewith a regeneration gas line for feeding hot regeneration gas to the adsorbent material is connected to the container, and a regeneration offgas line is also connected to the container; wherewith, according to the invention, the regeneration offgas line leads to a region of the container which region contains adsorbent material in a state which the material possesses immediately prior to regeneration.

In a preferred embodiment of the inventive apparatus, the container comprises a rotationally driven rotor which contains the adsorbent material. Advantageously, the container (rotor) is divided into three regions, which may be configured as cells each having a horizontal cross section resembling a circular sector, wherewith:

the first region contains adsorbent material for removing the moisture from a gas;

the second region contains adsorbent material in its state in which it undergoes the pre-regeneration operation; and the third region contains adsorbent material in its state in which it undergoes the (final) regeneration operation. Alternatively, the container may comprise a plurality of generally cylindrical vessels fixed to a carousel, each vessel containing adsorbent material, wherewith the vessels are moved stepwise through the described sequence of regions in which operations are carried out.

For further savings of energy, it is recommended to further refine the invention such that the heat contained in the hot, finally regenerated adsorbent material is transferred to a heat accumulator, later to be withdrawn from the accumulator for the purpose of heating cold regeneration gas. According to the invention, this makes it practicable to add more heat to e.g., practicable to heat to a higher temperature the regeneration air than under the state of the art, because the heat in the rotor at the end of the regeneration phase and the heat in the regeneration offgas are now both recovered. Further, with this refinement the adsorbent material is cooled with dry air rather than with humid ambient air as according to the state of the art.

BRIEF DESCRIPTION OF THE DRAWINGS

The invention will be described in detail hereinbelow with reference to the exemplary embodiments illustrated in the accompanying drawings.

DETAILED DESCRIPTION OF THE PREFERRED EMBODIMENTS

Figure 1:
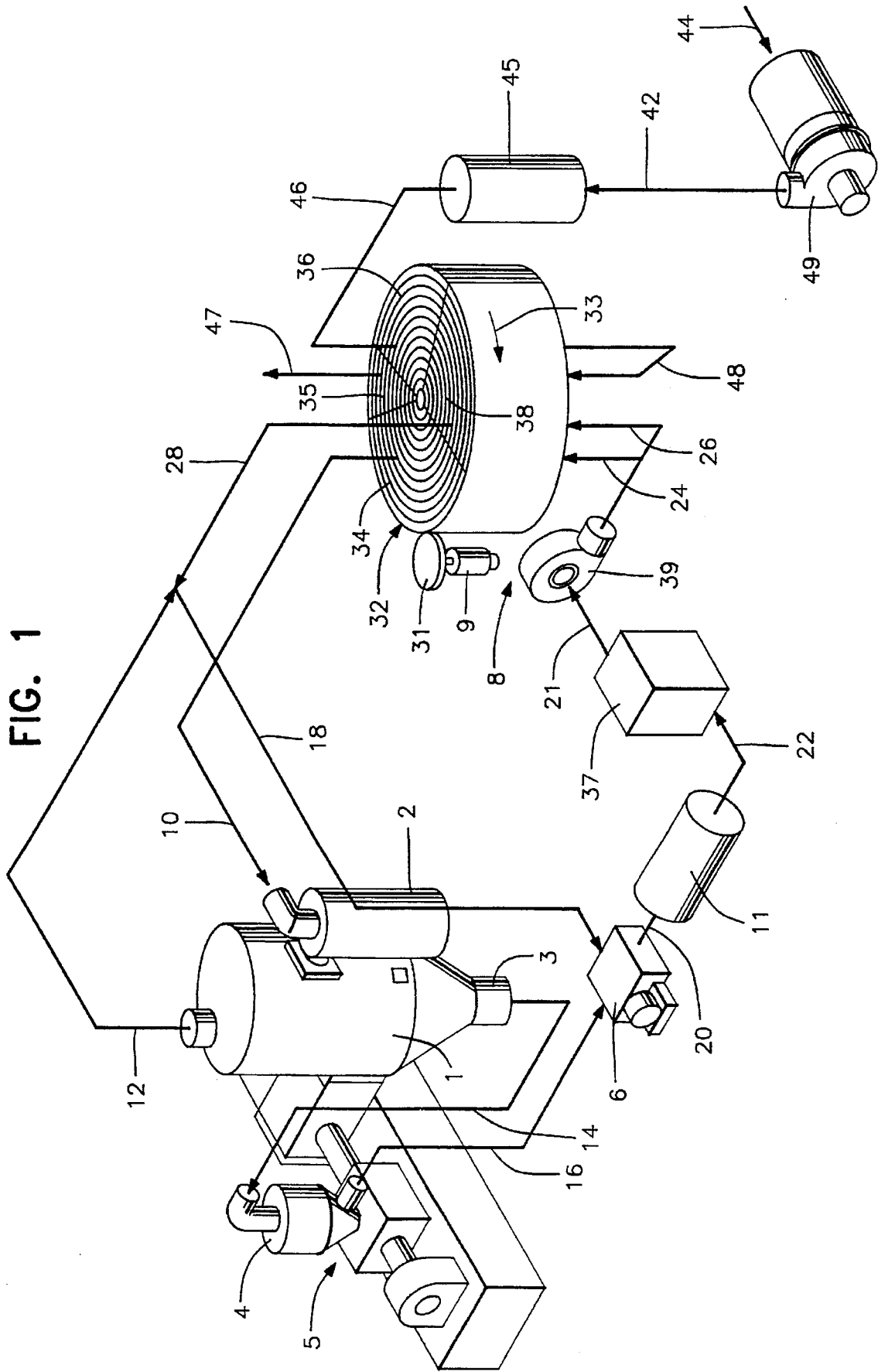
FIG. 1 shows an apparatus for drying of moist exhaust air from drying of granular plastics.

A granular plastic (not shown), comprising, e.g., PTFE (polytetrafluoroethylene), is subjected to drying in a plastics drying vessel 1 (FIG. 1) having a conical bottom. For this purpose, dried air supplied through an air line 10 is heated in a heater 2 before being introduced to the vessel 1. The air passes from the bottom upward through a bed of the granulate and leaves vessel 1 via an exhaust-air line 12. Air transport means are used to remove dried granulate through a granulate removal line 14 from a short cylindrical outlet region 3 at the bottom of vessel 1, and to feed same to a feed hopper 4 disposed over the feed opening of an extruder machine 5. Hopper 4 includes an air separator (not shown). The transport air is withdrawn from the air separator through line 16 and a valve 6.

As will be described in detail infra, the moisture-containing exhaust air is passed via exhaust air line 12 and through adsorbent material in a dehumidifying unit 8, where the adsorbent material adsorbs the moisture from said air. The dried air may then be passed (recycled) through line 10 for further drying of granulate. When the adsorbent material becomes saturated with moisture, it is subjected to regeneration wherein hot regeneration air is passed through the adsorbent material to remove moisture from the adsorbent material, following which the adsorbent material is recycled to drying of the described exhaust air in dehumidifier 8.

The dehumidifier 8 for drying exhaust air is essentially comprised of a rotor (rotary contacting structure) 32 driven by an electric motor 9 via a friction wheel or pinion 31 acting on the periphery of rotor 32. When viewed from above, the rotor 32 is driven clockwise (arrow 33) around its axis (bearing means not shown). The rotor 32 is filled with an adsorbent material, e.g. molecular sieves. During the rotation of rotor 32 the adsorbent material in the rotor passes through four operational regions (34, 35, 36, 38) which are fixed in space and are disposed successively in the direction opposite to the direction of rotation. The adsorbent material momentarily in region 34 during the rotation of rotor 32 is used to dry the exhaust air from line 12. The adsorbent material momentarily passing through region 35 during the rotation of rotor 32 is heated from the adsorption temperature (c. 60°–80° C.) to the regeneration temperature (180° C.), by hot regeneration offgas; in region 36, adsorbent material is regenerated in a final regeneration phase, by hot regeneration air; and the adsorbent material passing through region 38 is cooled from the regeneration temperature of region 36 to a lower temperature, at which temperature the adsorbent material can adsorb moisture from exhaust air when the adsorbent material enters region 34. E.g., if molecular sieves are used as the adsorbent material, the lower temperature may be around 60 ° C.

Exhaust air line 12 delivers exhaust air into humid air line 18 which leads to valve 6. Humid air from valve 6 passes through, successively, outlet line 20, a circulation filter 11, an air outlet line 22, a cooler 37, and an air line 21 which connects to the intake opening of a blower 39. The humid air stream delivered from the delivery side of blower 39 is divided, wherewith one partial humid air stream is introduced to the bottom of rotor 32 in region 34, via a first humid air line 24, and the second partial humid air stream is introduced to the bottom of rotor 32 in region 38, via a second humid air line 26. The ratio of the flows in the two air streams is chosen such that the second partial humid air stream, fed through line 26, has a lower throughput than the first partial humid air stream (line 24), which latter will be designated the "main humid air stream" which is input to the dryer 8.

As may be appreciated from the preceding, in region 34 moisture is removed from the main humid air stream delivered to region 34 from line 24. This dried air leaves region 34 on the opposite i.e. the upper side of the rotor 32, through the dry air line 10. The lower-throughput humid air stream from line 26 serves to cool the adsorbent material disposed in region 38. The air loses very little of its moisture in region 38, because the adsorbent material cannot adsorb any moisture at the relatively high temperatures which prevail in region 38. Thus this air leaves region 38 on the opposite i.e. the upper side of the rotor 32, through line 28, providing a second humid air stream which is delivered into humid air line 18.

To regenerate the adsorbent material disposed in region 36 during rotation of the rotor 32, a second blower 49 takes in exterior air (arrow 44) and delivers it via exterior air line 42 into a regeneration heater 45 where it is heated to, e.g. 250 ° C, using molecular sieves. The regeneration air leaving the heater 45 is passed via regeneration air line 46 into region 36 of rotor 32. The air leaving region 36 is passed through an outlet line 48, and is fed from below into region 35. This air has in the meantime picked up moisture and has a lower temperature than the regeneration air passed into region 36. Region 35 is ahead of region 36 and behind region 34, in the direction of rotation of the rotor, and contains adsorbent material which is saturated with moisture and which requires regeneration. Cooled regeneration air from region 35 is exhausted to the atmosphere, via line 47.

Optimum energy savings are achieved if the exhaust temperature of the pre-regeneration air from line 47 is so low that the relative humidity of this air is nearly as high as 100%. This is accomplished by adjusting the relative values of the following parameters:

quantity of regeneration air,
sizes of the regeneration regions (35, 36), and temperature of the regeneration air fed to region 36.

It is further within the scope of the invention to dispose the air lines 48 and 47 such that regeneration air does not flow through region 35 in the same direction as the humid exhaust air undergoing drying in region 34 (as is illustrated in FIG. 1), but instead flows in the opposite direction with respect to the air flow in region 34.

Figure 2:
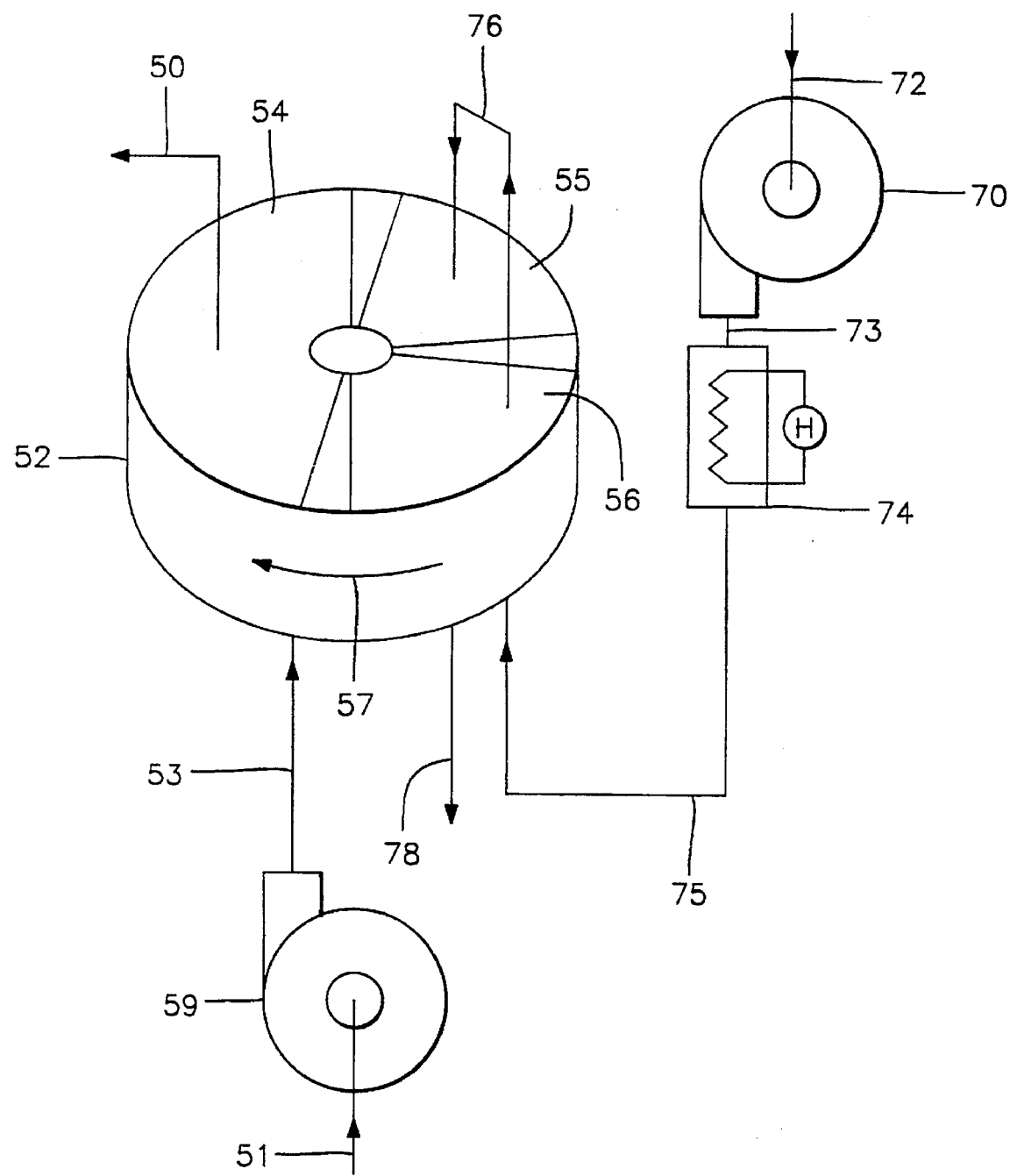
FIG. 2 is a schematic representation of the inventive apparatus of FIG. 1, for use in a heating/cooling/air-conditioning application.

The second embodiment of the invention, according to FIG. 2, is not only suitable for drying of exhaust air from drying of granulate but also for dehumidifying humid room air in an interior air heating/cooling/conditioning system.

A blower 59 takes in the room air to be dehumidified through an air line 51, and delivers it via a room air line 53 to be passed through a region 54 of a rotor 52. An adsorbent material, e.g. molecular sieves or silica gel, is disposed in the rotor 52, and serves to remove moisture from the room air passing through region 54, wherewith dried room air leaves region 54 through ventilating line 50 and is conveyed into the room (not shown).

A second blower 70 takes in exterior air via air line 72 and delivers it to a heating device 74 via a line 73. The regeneration air leaving heater 74 is passed via line 75 into a region 56 of rotor 52 where the hot regeneration air from line 75 removes water from adsorbent material contained in region 56. The regeneration air leaving region 56 passes via line 76 into a region 55 of rotor 52 which region 55 is ahead of region 56 and behind region 54, in the direction of rotation (arrow 57) of the rotor. In region 55, adsorbent material which is saturated with moisture is preheated by hot regeneration offgas supplied through line 76, wherewith the temperature of the adsorbent material is increased toward the regeneration temperature. The cooled regeneration offgas leaves region 55 via line 78 with a relative humidity of close to 100%, and is vented to the atmosphere.

Figure 3:
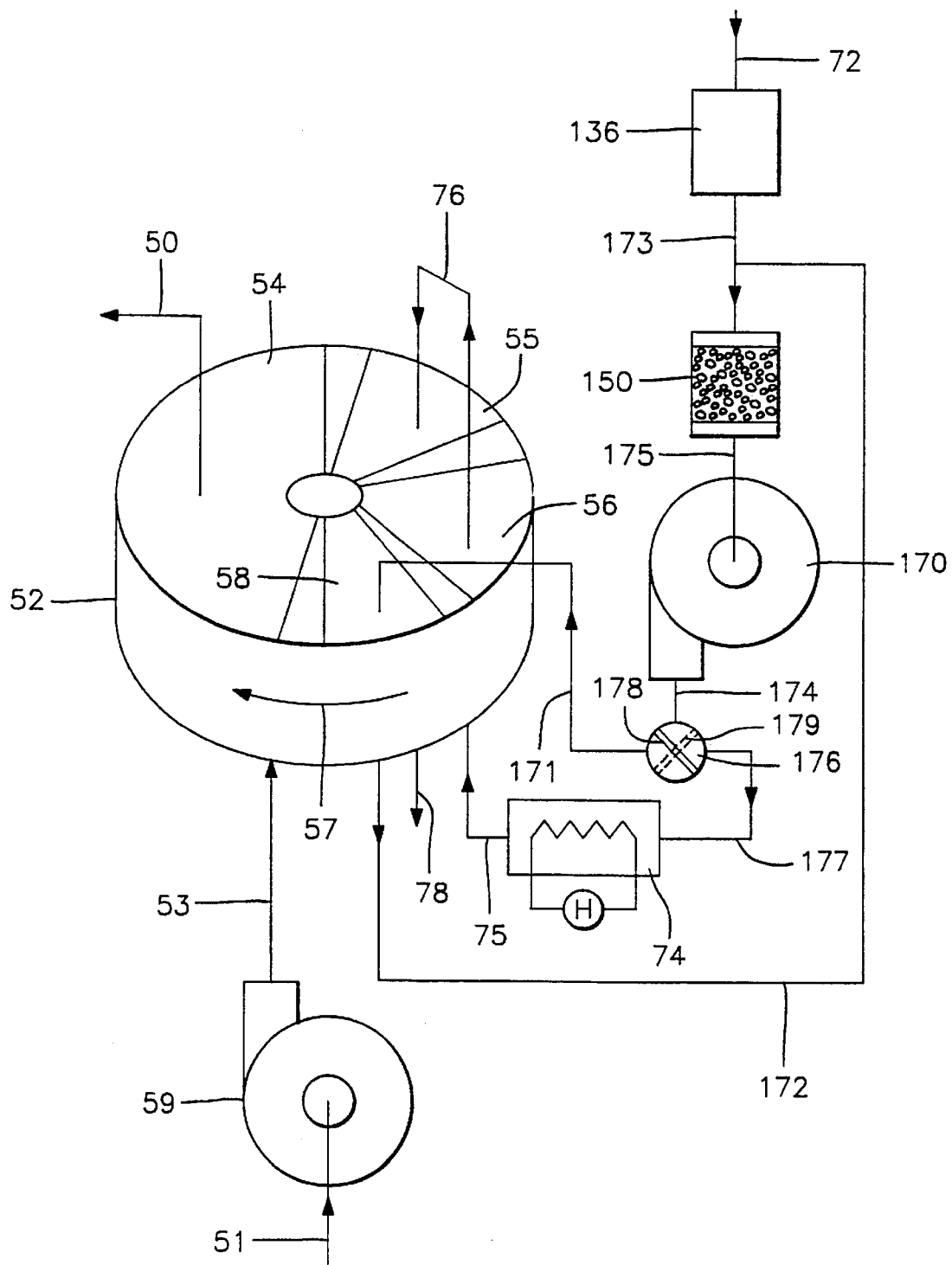
FIG. 3 is a schematic representation of a second embodiment of the invention.

In FIG. 3, illustrating a third exemplary embodiment of the invention, reference numerals according to FIG. 2 have been retained for apparatus components which are identical to those of FIG. 2. The embodiment of FIG. 3 is distinguished from that of FIG. 2 essentially in that a cooling zone 58 is provided in the rotor 52, which zone 58 is ahead of dehumidifying region 54 and behind final regenerating region 56 in the direction of rotation (arrow 57) of the rotor. To regenerate adsorbent material in rotor 52, a blower 170 takes in exterior air via, successively, air line 72, an air filter 136, an air line 173, a recovery unit 150, and an air line 175 leading to the axial intake of the blower. As described in Ger. OS 43 17 768, the recovery unit 150 is a container filled with small stones or metal spheres. The delivery side of blower 170 is connected via an air line 174 to a two-way selector valve 176 (one input, two selectable outputs plus shutoff), the positions of which are indicated symbolically at 178 (solid lines) and 179 (dotted lines). One outlet of valve 176 leads to the cooling region 58 of rotor 52, via a cooling air line 171. The outlet of cooling region 58 is connected via an air outlet line 172 to the air line 173. A second outlet of selector valve 176 is connected to the inlet of a regeneration heating device 74, via an air line 177. The regeneration air leaving heater 74 is passed via line 75 into the main regeneration region 56 of rotor 52.

During the regeneration cycle for the adsorbent material contained in rotor 52, selector valve 176 is in position 178, whereby blower 170 takes in exterior air from line 72 via filter 136 and recovery unit 150, cools it to the temperature of the exterior air, e.g. 20° C., and sends it under pressure through line 177 and heater 74, into the main regeneration region 56 of rotor 52. The regeneration air heated to around 250° C. by heater 74 and input via line 75 into main regeneration region 56 regenerates the adsorbent material present in region 56, by removing moisture from it. The regeneration-exhaust air leaving main regeneration region 56 is passed via line 76 to the pre-regeneration region 55 of the rotor, and leaves the rotor 42 via a flue 78, whereby the moisture carried by the pre-regeneration exhaust air is vented. If the temperature of the regeneration-exhaust air, which exits at the "end" of region 56 reckoned in the direction of rotation 57 of the rotor to be further conveyed in line 76, approaches the temperature at which the hot regeneration air leaves heater 74, the moisture will have been driven out of the adsorbent material, wherewith it is time to begin the cooling phase. For this purpose, selector valve 176 is moved to selector position 179 for a brief period, giving rise to a recirculation loop, wherein air blower 170 delivers air through cooling region 58, which air cools the adsorbent material in the region and thereby the air becomes heated. This now-hot air flows via line 172 into line 173, through recovery unit 150, and into the suction inlet of blower 170. Recovery unit 150 is thereby heated, and the air is cooled to the temperature of the recovery unit, which is the temperature of the exterior air. In this way, the recycled air gives up appreciable heat to the recovery unit 150. The now-cooled cooling air is passed from selector valve 176 via line 171 into the cooling region 58 of the rotor 52, where it cools the adsorbent material. Cooling air heated to an appreciably higher temperature leaves cooling region 58 via air line 172 and into line 173, whereby heat which it carries is again stored in the recovery unit.

The cooling air circulating in the cooling loop is passed through cooling region 58 until the lower levels of the packed bed in the recovery unit begin to heat up, wherewith the temperature of the air exiting the recovery unit begins to rise. At this point the selector valve 176 is switched into the regeneration position. Because of the fact that the regeneration gas leaving recovery unit 150 is already hot, the heater 74 does not need to be actuated until much later than previously. Because the process of heating the adsorbent material undergoing regeneration in region 56 and vaporizing the moisture adsorbed on said adsorbent material takes much longer that the cooling of the adsorbent material in cooling region 58, the angular extent of regions 55 and 56 is greater, in sum, than that of cooling region 58. Alternatively, the operations in regions 55 and 56 can be conducted for a longer time than that in the cooling region 58; e.g., regeneration air can be delivered to regions 55 and 56 for more time than cooling air is delivered to region 58. Typically the ratio is around 2:1.

With this embodiment of the invention, the advantage is afforded that variations in the dewpoint in the air leaving air line 50 are practically completely avoided, because in practice there will be little need (if any) to interrupt the rotation of the rotor 52 for regeneration and cooling of the adsorbent material. A principal cause of fluctuations in the dewpoint is such stopping and starting of the rotation.

In particular, the described ratio can be chosen such that, e.g., a given mass of adsorbent material undergoes 2 min of regeneration followed by 1 min of cooling. If (or once) these times are fixed, one can, based on the known amount of regeneration air, adjust the size of the recovery unit such that within the (2 min) regeneration time the recovery unit is practically completely cooled to room temperature. With this arrangement, it is assured that in the shorter cooling phase which results (during which the recovery unit 150 is heated), the recovery unit 150 becomes appreciably heated only on the inlet side (top in FIG. 3), so that even at the end of the cooling phase the air drawn into blower 170 from recovery unit 150 still will have a temperature which is practically equal to room temperature. After switching from the cooling phase to the heating phase, the heat stored in the recovery unit is utilized for preheating for the regeneration operation.

A further advantage is that only one selector valve is required, namely valve 176, in order to carry out cooling with dry recirculation air rather than humid ambient air.

Further, if the duration of the regeneration phase and the duration of the cooling phase are both kept short, the size of the recovery unit 150 can be small, or the unit 150 may be completely eliminated, in the sense that the mass of the blower itself acts as a recovery unit; accordingly (under such an arrangement), the blower 170 is advantageously a side-channel blower, in which a large mass of metal comes in contact with air which air it is desired to cool. Due to high air speeds in the blower, effective heat transfer conditions (high heat transfer parameters) are established, ensuring good cooling of the gas. A criterion for possible elimination of the recovery unit 150 filled with metal spheres is that the heat removed and to be removed from the adsorbent material is small in relation to the heat removal capacity of the blower.

Fundamentally, all blowers or compressors customarily used in adsorption installations (particularly in drying operations) may be used as recovery units, if they can withstand the temperatures encountered. At the end of the regeneration operation, temperatures will be around 80°–240 °C. Preferred are blowers or compressors comprised of metal. The higher the total heat capacity of the blower or compressor in relation to the amount of air pumped, the stronger the recuperative effect. Candidates include radial blowers, axial blowers (including side channel blowers), axial compressors, and centrifugal compressors.

Figure 4:
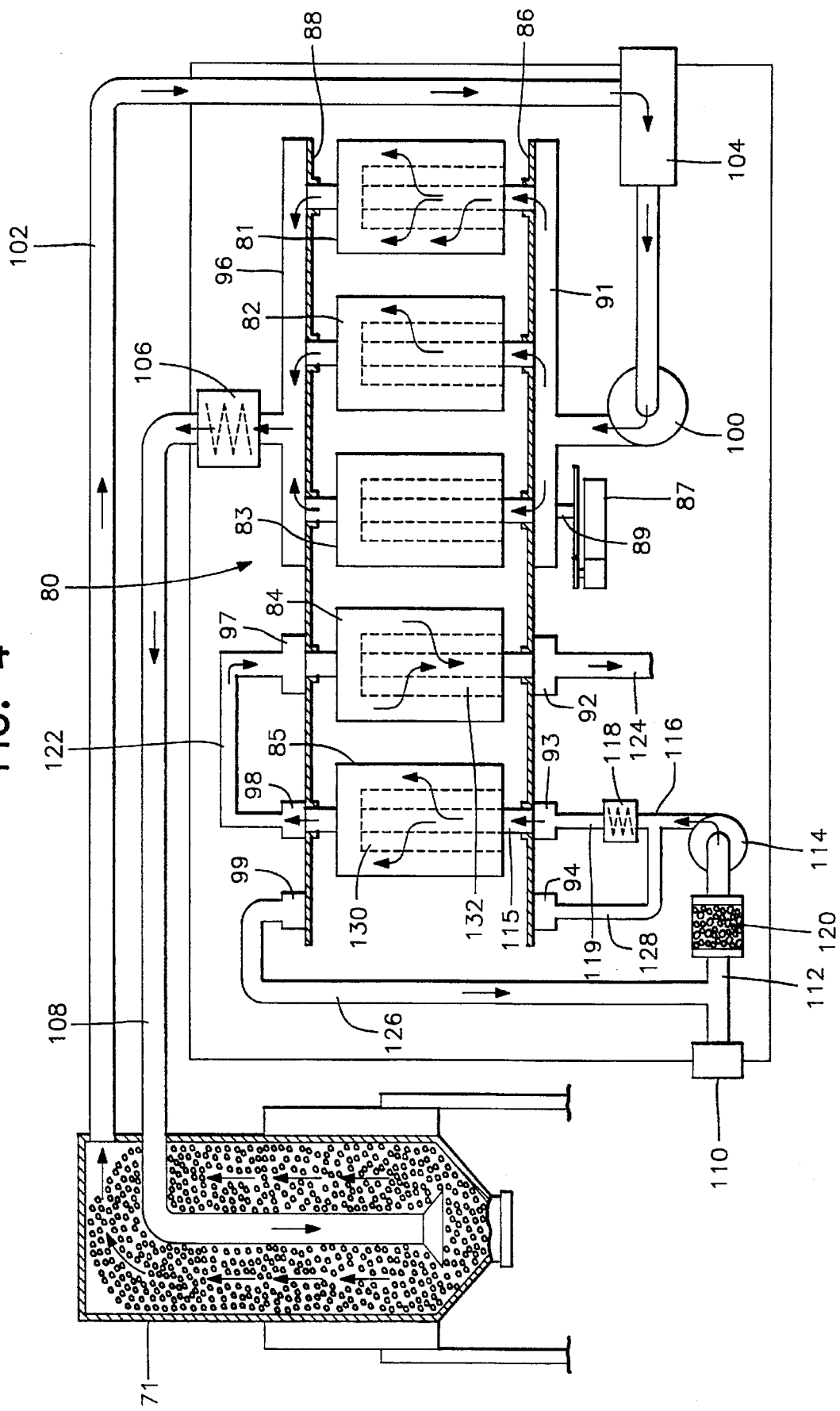
FIG. 4 is a schematic representation of a third embodiment of the invention.

According to FIG. 4, a conical-bottom drying vessel 71 for a drying process is coupled to a drying apparatus 80 of the carousel type. This type of dryer is generally disclosed in U.S. Pat. No. 3,757,491, herein incorporated in its entirety by reference. The carousel in the present exemplary embodiment is comprised of:

five cylindrical dehumidifying vessels (81, 82, 83, 84, 85), a lower "valve disc" 86 and an upper "valve disc" 88, and a shaft 89 driven by a motor 87.

The dehumidifying vessels (81–85) are held opposite corresponding openings in the valve discs 86 and 88. The assembly comprising the dehumidifying vessels and valve discs is rotatable as a carousel. Four lower stationary valve-chambers (91, 92, 93, 94) are associated with the lower valve disc 86. Likewise, the upper valve disc 88 cooperates with four stationary upper valve chambers (96, 97, 98, 99). The five dehumidifying vessels (81–85) are disposed on a circular guideway which is concentric with the shaft 89. The eight valve chambers (91–94, 96–99) are configured along circular arcs. A blower 100 takes in humid air from the drying vessel 71 through line 102 and a filter 104 and delivers it via the lower valve chamber 91 through the openings indicated by the arrows (FIG. 4), into the respective first three dehumidifying vessels (81–83), which vessels contain adsorbent material which is in the adsorption phase. Moisture is removed from the humid offgas by the adsorbent material in the vessels. The dried air leaving dehumidifying vessels (81–83) through the openings corresponding to the upper valve chamber 96 (see arrows in FIG. 4) is brought to the necessary temperature by a heating device 106 and is returned to drying vessel 71 via dried air line 108.

The fifth dehumidifying vessel 85 is in the regeneration phase. Ambient air is drawn into the intake of a second blower 114, via an intake filter 110, a line 112, and a heat accumulator 120, and is delivered to valve chamber 93 via a channel 116, a heater 118, and a connecting line 119. The hot regeneration air passes from valve chamber 93 through an opening (see arrow in FIG. 4) and into the interior of dehumidifying vessel 85, where it passes through adsorbent material 130 which is saturated with moisture. The regeneration air removes moisture from adsorbent material 130 and exits dehumidifying vessel 85 via a connector 117, and is fed to valve chamber 97 via valve chamber 98 and U-connector 122. Chamber 97 is disposed ahead of valve chamber 98 in the direction of rotation of the carousel. The regeneration offgas leaving valve chamber 97 is forced through dehumidifying vessel 84 and the adsorbent material 132 contained therein, which material is saturated with moisture and is at the temperature of adsorbent material leaving the adsorption phase. Thus, adsorbent material 132 is appreciably cooler than adsorbent material 130. Accordingly, the hot regeneration offgas from valve chamber 97 heats the adsorbent material 132; upon leaving dehumidifying vessel 84, it is exhausted via valve chamber 92 and a vent line 124. The adsorbent material 132 is in a pre-regeneration phase, in which it is gradually heated to the regeneration temperature by the regeneration offgas, which offgas itself becomes increasingly drier during the regeneration phase.

Obviously, it is possible to configure the connecting line 122 such that it connects valve chamber 98 with valve chamber 92, wherewith in that instance the valve chamber 97 is connected to a vent which exhausts the cooled regeneration offgas to the atmosphere. With this embodiment, the regeneration offgas flows through the adsorbent material 132 in the same direction as the exhaust air flows through the adsorbent material contained in the cylindrical dehumidifying vessels (81, 82, 83), and in the same direction as the regeneration gas flows through the adsorbent material 130; namely, upward in FIG. 4. An advantage of this is that the moisture contained in adsorbent material 132 is driven off in the upward direction, thus in the same direction as the moisture contained in adsorbent material 130.

During the cooling phase which is carried out subsequently to the regeneration phase, the carousel has been incrementally rotated, along with the associated cylindrical dehumidifying vessels and the valve discs (86, 88), around pivot means 89, so that connecting line 117 is now disposed under valve chamber 99, and connector 115 associated with cylindrical vessel 85 is disposed above valve chamber 94. Valve chamber 99 is connected to connecting line 112 via connector 126. Because the distance between the center of the opening in valve plate 88 which opens into valve chamber 99 and the center of the opening in valve plate 88 which opens into valve chamber 98 is smaller than the corresponding distance between the centers of the openings in valve plate 88 which open into valve chambers 98 and 97, respectively (wherewith advantageously the ratio of the center-to-center distances is 0.5); and the same ratio of distances applies for the openings in lower valve plate 86 (opening into valve chambers 94, 93, and 92); accordingly, if the carousel is rotated in a step which comprises, e.g., only half of the larger distance, then cylindrical dehumidifying vessels 83 and 84 will not be connected to any valve chamber, and thus for a period of time these vessels will not have regeneration air or regeneration offgas (regeneration exhaust air) passing through them.

Instead, blower 114 takes in cool exterior air and pumps it, via a connecting line 128 branching off from line 116, through valve chamber 94 into cylindrical dehumidifying vessel 85, wherewith the exhaust air from vessel 85 is passed via valve chamber 99 and line 126, back through heat accumulator 120 and back to the intake of blower 114. In this way the heat in the hot and finally regenerated adsorbent material can be transferred to the heat accumulator 120, to the extent that the adsorbent material thereby cooled by dry air is eventually cooled to room temperature.

When the adsorbent material being subjected to this cooling becomes sufficiently cool, cylindrical dehumidifying vessel 85 is moved further so as to begin the adsorption phase, by the appropriate rotation of the carousel. At the same time:

cylindrical dehumidifying vessel 84 is moved into position to begin the final regeneration phase, in which the openings in the upper valve plate 88 and the lower valve plate 86, which openings are associated with vessel 84, now communicate with valve chambers 98 and 93, respectively; and valve chambers 99 and 94 are closed off by valve plates 88 and 86, respectively.

Under these circumstances, blower 114 takes in cool exterior air via filter 110 and heat accumulator 120, where the air is heated. This reduces the load on heater 118, which now only needs to heat sufficiently to provide the regeneration temperature for the final regeneration stage. Only after the accumulator 120 has given up all its excess heat must heater 118 be operated at full load for heating the regeneration gas.

I claim:

1. A method for treating an adsorbent material containing moisture, said method comprising:

regenerating the adsorbent material by removing moisture from the adsorbent material by passing hot regeneration gas through the adsorbent material and obtaining regeneration offgas that exits from the regenerated adsorbent material, cooling the adsorbent material after removal of the moisture from the adsorbent material, and pre-regenerating the adsorbent material by passing the regeneration offgas through the adsorbent material immediately before said adsorbent material is subjected to regeneration, said regeneration offgas having a lower temperature than the hot regeneration gas.

2. A method according to claim 1 further comprising the steps of passing a humid exhaust gas through a moist adsorbent material prior to passing the regeneration offgas therethrough, and wherein the adsorbent material which has accumulated moisture is contacted first by a flow of hot regeneration offgas for pre-regeneration, and then by a flow of hot regeneration gas for regenerating the adsorbent material.

3. A method according to claim 1, wherein the adsorbent material is moved through an adsorption phase, in which the adsorbent material removes moisture from a gas, a pre-regeneration phase, in which the adsorbent material is heated and preregenerated by regeneration offgas such that the temperature of said adsorbent material is increased toward the regeneration temperature, and a regeneration phase, in which the adsorbent material containing appreciable accumulated moisture is regenerated by hot regeneration gas.

4. A method according to claim 1, wherein the adsorbent material is moved continuously during the treating of the adsorbent material.

5. A method according to claim 1, wherein the adsorbent material is cooled following said regeneration step by passing a cooling gas through the regenerated adsorbent material wherein said cooling gas transfers heat contained in the adsorbent material to a heat accumulator for pre-heating the regeneration gas.

6. A method according to claim 5, wherein the mass of a blower is utilized as a heat accumulator.

7. A method according to claim 1 further comprising the step of transferring heat contained in the adsorbent material following regeneration of the adsorbent material to a heat accumulator.

8. A method according to claim 7, wherein the heat accumulated in the heat accumulator is utilized to heat the regeneration gas.

9. A method according to claim 1, wherein molecular sieve material is used as an adsorbent material.

10. A method according to claim 1 further comprising the steps of adjusting the quantity of regeneration gas, the temperature of the regeneration gas, and the quantity of pre-regeneration offgas passed through the adsorbent material during pre-regeneration in relation to the quantity of regeneration gas during the regeneration step such that the relative humidity of the cool regeneration offgas leaving the adsorbent material during pre-regeneration is close to 100%.

11. A method according to claim 2 wherein said method for treating comprises placing the adsorbent material within a continuously rotating rotor defining four regions, wherein, in a first region the adsorbent material takes up moisture from a gas which is passed therethrough, in a second and a third region the adsorbent material undergoes regeneration, and in a fourth region the adsorbent material is cooled;

wherein the regeneration carried out in the second and third regions and the cooling carried out in the fourth region are conducted in alternative steps.

12. The method according to claim 1, wherein the adsorbent material is moved stepwise during the treating of the adsorbent material.

13. The method according to claim 1, wherein silica gel is used as an adsorbent material.

* * * * *